United States Patent
Lukas (10) Patent No.: US 11,973,440 B2
(45) Date of Patent: Apr. 30, 2024

(54) ISOLATED DC/DC CONVERTER WITH SECONDARY-SIDE FULL BRIDGE DIODE RECTIFIER AND ASYMMETRICAL AUXILIARY CAPACITOR

(71) Applicant: KOSTAL Automobil Elektrik GmbH & Co. KG, Luedenscheid (DE)

(72) Inventor: Ulrich Lukas, Luedenscheid (DE)

(73) Assignee: KOSTAL Automobil Elektrik GmbH & Co. KG, Luedenscheid (DE)

( * ) Notice: Subject to any disclaimer, the term of this patent is extended or adjusted under 35 U.S.C. 154(b) by 450 days.

(21) Appl. No.: 17/482,749

(22) Filed: Sep. 23, 2021

(65) Prior Publication Data

US 2022/0014105 A1    Jan. 13, 2022

Related U.S. Application Data

(63) Continuation of application No. PCT/EP2020/057204, filed on Mar. 17, 2020.

(30) Foreign Application Priority Data

Mar. 23, 2019 (DE) .................... 10 2019 002 098.7

(51) Int. Cl.
  *H02M 3/335*    (2006.01)
  *H02M 1/00*    (2006.01)
  (Continued)

(52) U.S. Cl.
  CPC ....... *H02M 7/5388* (2013.01); *H02M 1/0058* (2021.05); *H02M 3/33573* (2021.05); *H02M 3/33576* (2013.01); *H02M 3/01* (2021.05)

(58) Field of Classification Search
  CPC ............ H02M 3/22; H02M 1/08; H02M 1/36; H02M 3/24; H02M 3/325; H02M 3/335;
  (Continued)

(56) References Cited

U.S. PATENT DOCUMENTS 6,147,886 A * 11/2000 Wittenbreder ...... H02M 3/3378
  363/95
6,771,521 B1 * 8/2004 Xiong ............... H02M 3/33592
  363/21.06

(Continued)

FOREIGN PATENT DOCUMENTS

DE    102012023425 A1    6/2014
EP       1033806 A2     9/2000
(Continued)

OTHER PUBLICATIONS

The International Bureau of WIPO, International Preliminary Report on Patentability for International Application No. PCT/EP2020/057204, issued Sep. 28, 2021.
(Continued)

*Primary Examiner* — Thienvu V Tran
*Assistant Examiner* — Nusrat Quddus
(74) *Attorney, Agent, or Firm* — Brooks Kushman P.C.

(57) ABSTRACT

A voltage converter for direct current includes a power converter circuit having a transformer, a switch converter bridge on a primary-side of the transformer, and a full-bridge rectifier on a secondary side of the transformer. The full-bridge rectifier has first and second rectifier branches. A capacitor is asymmetrically connected to the second rectifier branch.

17 Claims, 4 Drawing Sheets

(51) Int. Cl.
*H02M 3/00* (2006.01)
*H02M 7/5388* (2007.01)

(58) Field of Classification Search
CPC ............... H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 1/10; H02M 3/33561; H02M 7/003; H02M 1/12; H02M 3/3155; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 7/1552; H02M 7/1623; H02M 1/4225; H02M 3/073; H02M 3/10; H02M 3/135; H02M 3/137; H02M 7/10; H02M 7/00; H02M 7/06; H02M 7/064; H02M 7/068; Y02B 70/1491; G06F 1/263; H01L 25/112; H01L 25/115; H01L 23/34; H01R 13/6675; H01R 29/00; H01R 31/065; G09G 3/20; H02K 11/046; H01F 2027/406; H05K 7/20927; G05F 1/30; G05F 1/33; G05F 1/32; G05F 1/34; G05F 1/38; G05F 1/52; H02J 7/12

See application file for complete search history.

(56) References Cited

U.S. PATENT DOCUMENTS

| | | | |
|---|---|---|---|
| 7,864,549 B1* | 1/2011 | Wittenbreder, Jr. | ................. H02M 3/33576 363/21.06 |
| 2001/0030879 A1* | 10/2001 | Greenfeld | ......... H02M 3/33561 363/17 |
| 2002/0001203 A1 | 1/2002 | Jitaru | |
| 2003/0165070 A1 | 9/2003 | Maeda et al. | |
| 2003/0227280 A1* | 12/2003 | Vinciarelli | ............ H02M 7/003 323/265 |
| 2005/0002209 A1* | 1/2005 | Mueller | ............ H02M 3/33592 363/22 |
| 2011/0101951 A1* | 5/2011 | Zhang | ................ H02M 3/33592 323/305 |
| 2013/0107581 A1* | 5/2013 | Krause | .................. H02M 7/217 363/17 |
| 2013/0301304 A1* | 11/2013 | Murakami | ........ H02M 3/33507 363/17 |
| 2013/0336013 A1 | 12/2013 | Mueller | |
| 2017/0025962 A1* | 1/2017 | Davidson | ................ H02M 1/44 |
| 2018/0054135 A1 | 2/2018 | Ye et al. | |
| 2018/0309375 A1* | 10/2018 | Luccato | ............ H02M 3/33571 |

FOREIGN PATENT DOCUMENTS

JP 2006288134 A 10/2006
WO 2014083080 A2 6/2014

OTHER PUBLICATIONS

European Patent Office, International Search Report for International Application No. PCT/EP2020/057204, dated Jun. 29, 2020.
German Patent and Trademark Office, German Search Report for German Patent Application No. 10 2019 002 098.7, dated Nov. 6, 2019.
The State Intellectual Property Office of People's Republic of China, Chinese First Office Action for Chinese Patent Application No. 202080023532.0 issued Nov. 2, 2023.

* cited by examiner

ISOLATED DC/DC CONVERTER WITH SECONDARY-SIDE FULL BRIDGE DIODE RECTIFIER AND ASYMMETRICAL AUXILIARY CAPACITOR

CROSS-REFERENCE TO RELATED APPLICATIONS

This application is a continuation of International Application No. PCT/EP2020/057204, published in German, with an International filing date of Mar. 17, 2020, which claims priority to DE 10 2019 002 098.7, filed Mar. 23, 2019, the disclosures of which are hereby incorporated by reference herein.

TECHNICAL FIELD

The present invention relates to a voltage converter for direct current, the voltage converter including a circuit bridge that includes first, second, third, and fourth power switches, each power switch has a control connection and a load path extending between two power connections, the load paths of the first and second power switches being connected to a first circuit node, the load paths of the third and fourth power switches being connected to a second circuit node, the first and second power switches and the third and fourth power switches in each case being connected in series between the terminals for an input direct voltage, and the voltage converter further including a transformer whose primary winding is connected to the first and second circuit nodes and whose secondary winding is connected to a downstream full bridge rectifier system.

BACKGROUND

Voltage converters of this type for direct current (i.e., DC/DC converters) are also referred to as full bridge converters and are used to convert a direct voltage (i.e., DC voltage) into a higher or lower direct voltage. These voltage converters are used, for example, for applications in the field of welding equipment. By means of a rectifier, an input alternating voltage on the power grid side is initially converted into a direct voltage, which with the aid of capacitors is smoothed and supplied to the voltage converter as an input voltage.

The operating principle of these voltage converters is that, due to clocked opening and closing of electronic power switches, the output of the inverter formed by the power switches is connected to different potentials, thus generating an alternating voltage of a desired frequency. By means of the downstream transformer, this alternating voltage is transformed to the desired voltage value and once again rectified in a full bridge rectifier system. Controlling the time period during which the power switches are switched on and forming an average of the rectified output current or the rectified output voltage allows power transmission having a transfer ratio, which is adjustable within a wide range, between input and output direct voltage or between the direct currents.

For smoothing the switched current waveform, a filter circuit made up of at least one smoothing or storage throttle (choke) is necessary with these voltage converters, while the voltage is generally smoothed by capacitors in parallel to the input terminals and output terminals.

DE 102 27 832 C1 discloses a voltage converter for direct current according to the Technical Field above. In the full bridge converter described therein, the four power switches used to form the circuit bridge are all designed as MOSFETs.

Another generic voltage converter is known from the German Patent Publication DE 10 2012 023 425 A1. A special feature of the voltage converter described in this document is that an asymmetrical circuit design and an asymmetrical operating method are used to achieve high efficiency. This voltage converter thus allows switching losses in the power switches to be essentially eliminated.

It is provided that two of the power switches on the primary side are switched in the current-free state or when there is little residual current, while the other two power switches are switched in an initially voltage-free state at maximum current flow. The power switches that are switched in a current-free state are preferably IGBTs, while the power switches that are switched in a voltage-free state are advantageously designed as MOSFETs.

To achieve a virtually completely current-free switching operation of the MOSFETs used, the rising rate of the voltage when the current flow is switched off is limited by circuitry to a very low value, so that the current drops much more quickly than the voltage rise. For this purpose, it is advantageously possible to use a capacitor that is connected in parallel to the particular MOSFET and that functionally supplements the output capacitance of the MOSFET that is basically present. This capacitor may be formed by one or more capacitors or by installation capacitors and circuit capacitors.

According to the prior art, a typical operating mode of such a voltage converter is the discontinuous mode, also referred to the intermittent mode. This means that the current in the storage throttle returns to zero within a switching cycle. The zero crossing allows the storage throttle to be situated in a functionally equivalent manner in the alternating current path, in series with the power transformer, instead of on the input side or output side in series with the direct current path.

For an input voltage and output voltage that vary only slowly over time, this means that the level of voltage overshoot processes at all power switches is limited to the level of the direct voltage, which may reduce the voltage load on the components by a factor of two.

For the storage throttle in the power section, this means that the storage throttle may be designed together with the power transformer as a single unit, for example as a high-reactance transformer.

However, this operating mode has the following disadvantage: each time the current in the storage throttle passes through zero, a damped oscillation ("ping") in the oscillating (resonant) circuit is excited, which results from the coil inductance in conjunction with the parasitic capacitances of the coil, transformer, diodes, transistors, and the mounting technology.

The problem lies in the energy content of this oscillating circuit. In the pulse pause of the power transmission, the oscillation dies down, resulting in heating of the transformer, the storage throttle, and circuit components connected thereto. The oscillation also causes interfering emissions and may possibly even damage or destroy the circuit.

SUMMARY

An object is to provide a voltage converter in which the above-noted problem is eliminated, or at least significantly reduced, in a simple and cost-effective manner.

Embodiments of the present invention achieve this object by asymmetrically connecting a capacitor to a rectifier branch of the full bridge rectifier system (that is, the capacitor is asymmetrically connected to one of the two rectifier branches of the full bridge rectifier system).

The achievement of this object using a capacitor requires only a single additional component, which eliminates the symmetry of the full bridge rectifier system and which is also relatively inexpensive.

It is particularly advantageous that this simple measure may at the same time improve the efficiency of the voltage converter.

It is also advantageous that the action of this supplementary circuit may be switched on and off as needed, using only one additional switching element. By making use of a resonance effect when the power switch is switched on, this allows an increase in the adjustment range of the transfer ratio of the input voltage to the output voltage.

Embodiments of the present invention provide a power converter circuit with a primary-side switch converter bridge and a secondary-side full-bridge rectifier, wherein a capacitor is asymmetrically connected to a branch of the full-bridge rectifier.

In carrying out at least one of the above and/or other objects, a voltage converter for direct current is provided. The voltage converter includes a power converter circuit having a transformer, a switch converter bridge on a primary-side of the transformer, and a full-bridge rectifier on a secondary side of the transformer. The full-bridge rectifier has first and second rectifier branches. The voltage converter further includes a capacitor asymmetrically connected to the second rectifier branch.

The voltage converter may further include an electromechanical or electronic switching element. In this case, the capacitor is dis-connectable from the second rectifier branch via the switching element.

In embodiments, slow-switching electronic switches are connected to the second rectifier branch and fast-switching electronic switches are connected to the first rectifier branch.

The voltage converter may be operated at least temporarily in discontinuous mode.

In embodiments, the switch converter bridge includes a first bridge portion having serially connected power switches formed by MOSFETS and a second bridge portion having serially connected power switches formed by IGBTs.

In embodiments, the first rectifier branch includes serially connected first and second Schottky diodes and the second rectifier branch includes serially connected third and fourth non-Schottky diodes.

The capacitor may be asymmetrically connected to the second rectifier branch by being connected in parallel to a node between serially connected third and fourth diodes of the second rectifier branch and a negative line of an output voltage of the full-bridge rectifier.

Further, in carrying out at least one of the above and/or other objects, a voltage converter for direct current is provided. The voltage converter includes a circuit bridge, a full bridge rectifier, and a transformer. The circuit bridge has first, second, third, and fourth power switches. Each power switch includes a control connection and a load path extending between two power connections. The load paths of the first and second power switches are connected to a first circuit node and are connected in series between terminals for an input direct voltage. The load paths of the third and fourth power switches are connected to a second circuit node and are connected in series between the terminals for the input direct voltage. The full bridge rectifier has first and second rectifier branches. The transformer has a primary winding connected between the first and second circuit nodes and a secondary winding connected between the first and second rectifier branches. The voltage converter further includes a capacitor asymmetrically connected to the second rectifier branch.

BRIEF DESCRIPTION OF THE DRAWINGS

Advantageous embodiments and refinements of the voltage converter according to the invention are explained with reference to the drawings, which include the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The functional principle of a generic switching converter according to the prior art, which is described in greater detail in the above-noted German Patent Publication DE 10 2012 023 425 A1, is briefly explained below and illustrated with reference to FIG. 4.

Figure 4:
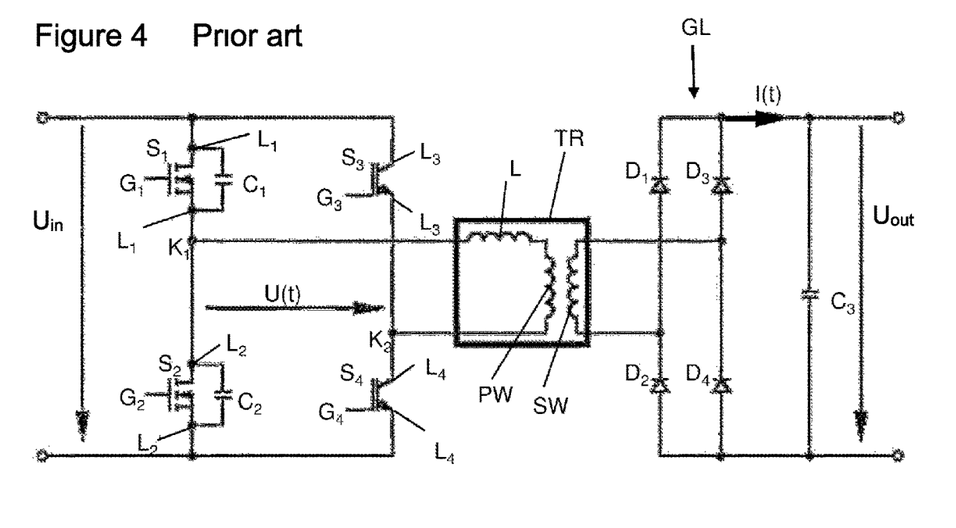
FIG. 4 shows a schematic diagram of a known voltage converter.

The known voltage converter illustrated in a schematic diagram in FIG. 4 is supplied at its input side with an input direct voltage $U_{in}$. A circuit bridge, as the central element of the voltage converter, includes four power switches $S_1$, $S_2$, $S_3$, $S_4$. These four power switches $S_1$, $S_2$, $S_3$, $S_4$ have a control connection $G_1$, $G_2$, $G_3$, $G_4$, respectively, and a load path that extends in each case between two power connections $L_1$, $L_1'$; $L_2$, $L_2'$; $L_3$, $L_3'$; $L_4$, $L_4'$. First and second power switches $S_1$, $S_2$ are formed by MOSFETs whose load paths are connected at a first circuit node $K_1$ and connected in series between the terminals for input direct voltage $U_{in}$. Capacitors $C_1$, $C_2$ in each case are connected in parallel to the individual MOSFETs. Third and fourth power switches $S_3$, $S_4$ are formed by IGBTs, whose load paths are connected at a second circuit node $K_2$ and which are likewise connected in series between the terminals for the input direct voltage $U_{in}$.

First and second circuit nodes $K_1$, $K_2$ of the circuit bridge are connected to a primary winding PW of a transformer TR. A secondary winding SW of transformer TR is connected to a downstream full bridge rectifier system GL. Full bridge rectifier system GL is formed by four diodes $D_1$, $D_2$, $D_3$, $D_4$. An output direct voltage $U_{out}$ present at the output of full bridge rectifier system GL is smoothed by a smoothing capacitor $C_3$. Not illustrated in the circuit diagram are electrical components for clocked activation of the four power switches $S_1$, $S_2$, $S_3$, $S_4$.

Figure 6:
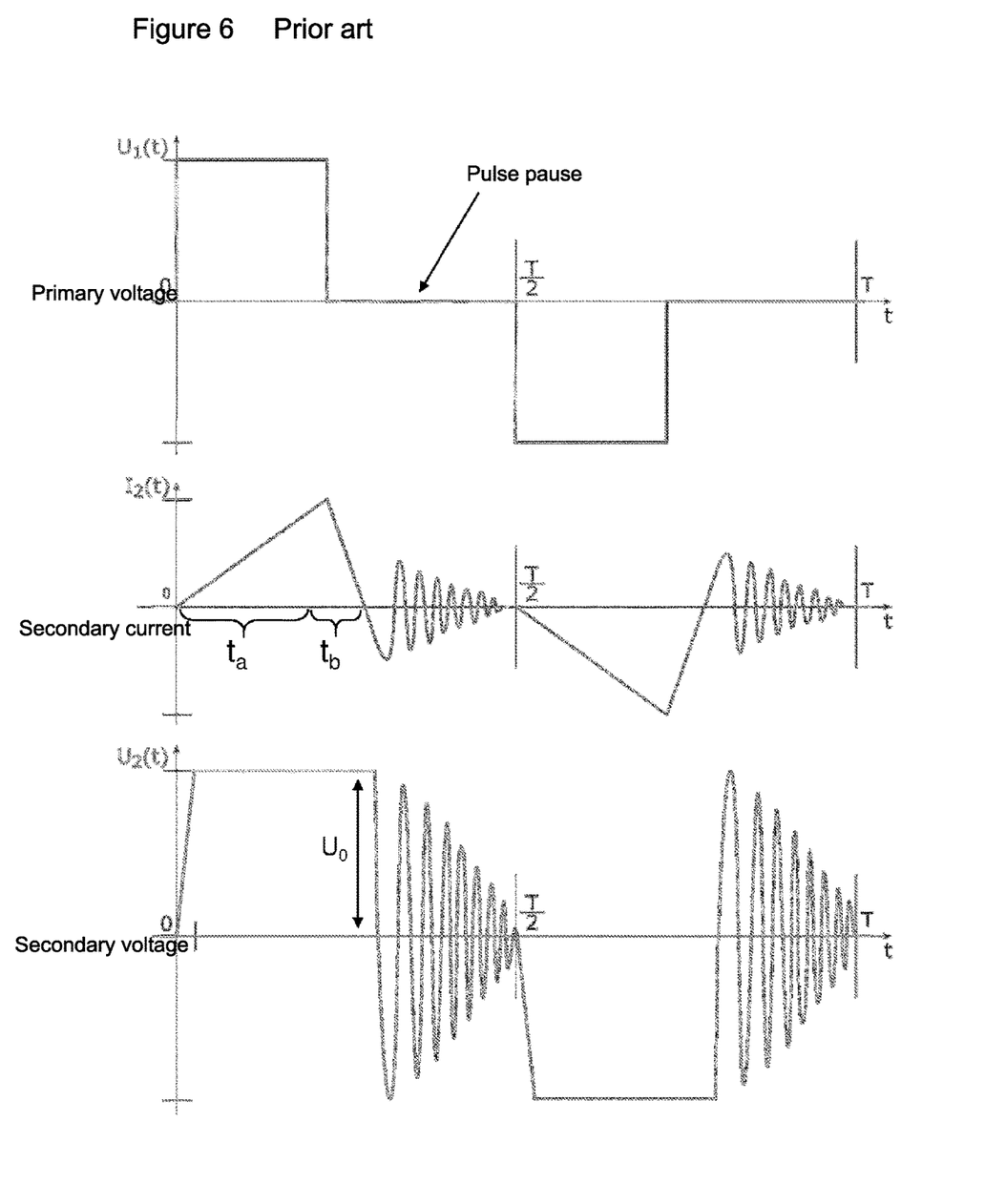
FIG. 6 shows a diagram illustrating the basic pattern of the current and the voltage during operation of the known voltage converter, together with the problem of oscillation in the pulse pause.

The power transmission takes place via an essentially triangular output current $I_2(t)$ of transformer TR with an approximately square wave output voltage $U_2(t)$ of transformer TR, as is apparent from the middle and bottom diagrams in FIG. 6.

The so-called intermittent mode of the input- and output-side circuit section, with a pulse pause between the phases having different current polarity in the windings of transformer TR, is typical (FIG. 6, top diagram). During the pulse pause, primary voltage $U_1(t)$ of transformer TR is zero or zero-mean, and no net power is transmitted to the secondary side.

Due to the intermittent or limiting operation and the triangular current waveform, advantages are obtained by using silicon PN junction diodes in the output-side rectifier portion of the converter circuit.

As a feature of the operating principle, the triangular current waveform naturally results in the current-free state during the switchover of third and fourth power switches $S_3$, $S_4$ formed by IGBTs, while the activation of first and second power switches $S_1$, $S_2$ formed by MOSFETs defines the point in time when the peak value of the triangular current is reached.

A direct current smoothing throttle, used in the output portion in many push-pull full bridge converters, may be dispensed with here. After the rectification in the full bridge rectifier system, the triangular alternating current is assisted by the smoothing capacitor $C_3$ in a purely capacitive manner. Any residual ripple may be removed by a filter stage, provided downstream, having small dimensions according to the value and size of the component.

The generation of the triangular output current $I_2(t)$ takes place in the circuit, in that a remainder of the square wave output voltage $U_2(t)$ of the semiconductor full bridge that is constant within the high-frequency operating cycle causes a linearly increasing current flow in the circuit inductor L. The magnitude of the remainder of the square wave output voltage $U_2(t)$ is the difference between input direct voltage $U_{in}$ and output direct voltage $U_{out}$ that is transformed via the winding number ratio of transformer TR. The algebraic sign changes twice within a complete operating cycle T.

After the output current $I_2(t)$ increases to the triangle peak value during the time period $t_a$, a linear drop to zero takes place during the time period $t_b$, while at circuit inductor L, only the transformed output voltage with a reversed polarity is present (FIG. 6, middle diagram).

Over the two falling edges of the magnitude of the triangular current $I_2(t)$, in the opposite phase for a rising triangle edge, each of first and second power switches $S_1$, $S_2$ formed by MOSFETs must conduct the current through the component in the reverse direction with respect to the flow direction. The integrated substrate diode paths of the MOSFETs or separate inverse diodes are used for this purpose. For MOSFETs, the drop in lost voltage decreases at the substrate diode paths when the control signal switches on the component during this time (synchronous rectification).

In the illustrated circuit, it is advantageous that the circuit inductance L, in whole or in part, is already included in the form of the leakage inductance of the system made up of the input winding PW and output winding SW of transformer TR. A separate component may be dispensed with due to the design as a high-reactance transformer. A further advantage of the triangular current waveform in transformer TR is the low harmonic content. This is because the harmonic components of the Fourier series expansion decrease with the square of the ordinal number, in contrast to the square wave current flow of the conventional push-pull PWM converter circuit, in which the amplitudes of the harmonic components decrease only linearly with the ordinal number. As a result, the power loss drops significantly in the copper winding due to eddy current and current displacement (proximity effect).

Figure 5:
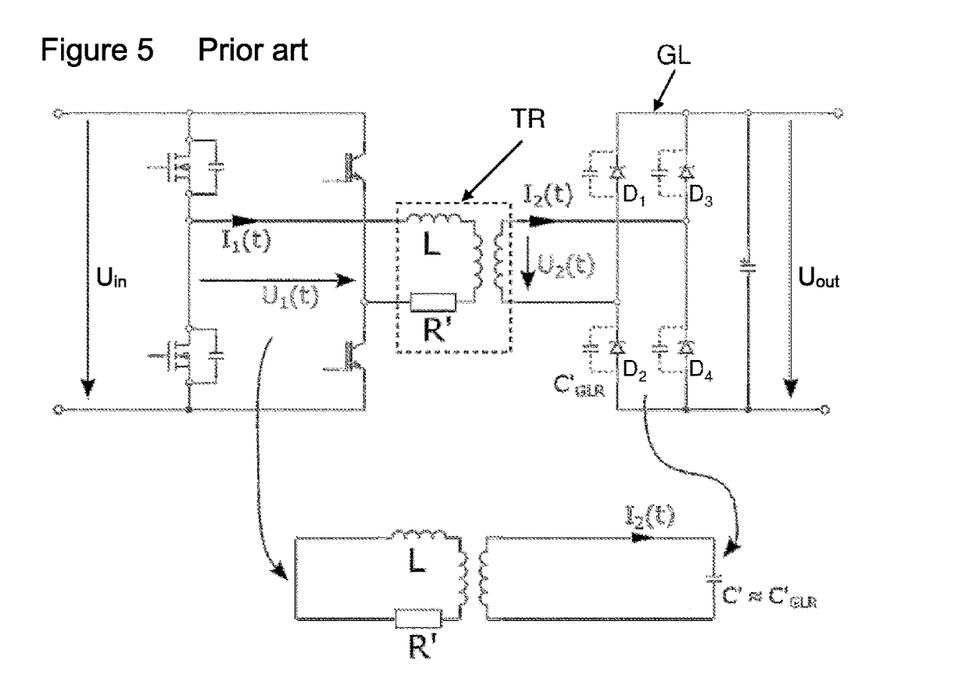
FIG. 5 shows a diagram for explaining the problem to be solved, based on the known voltage converter.

A problem leading to embodiments of the present invention is explained here with reference to FIG. 5 in conjunction with FIG. 6. FIG. 5 shows a slightly modified illustration of the known voltage converter shown in FIG. 4. Components in FIG. 5 having an equivalent function are denoted by the same reference symbols as in FIG. 4.

For the time period of the pulse pause, the circuit in FIG. 5, as a model, may be simplified for the equivalent circuit diagram illustrated in the lower portion of the same figure, where L represents the circuit inductance and R' represents the loss resistance or damping resistance of transformer TR.

It is initially assumed that full bridge rectifier system GL is in open-circuit mode at full output direct voltage $U_{out}$. On the primary side of transformer TR, the circuit bridge made up of power switches $S_1$, $S_2$, $S_3$, $S_4$ acts as a short circuit in the pulse pause of the power transmission.

Diodes $D_1$, $D_2$, $D_3$, $D_4$ that form full bridge rectifier system GL are blocked. The parasitic capacitances $C'_{GLR}$ of diodes $D_1$, $D_2$, $D_3$, $D_4$, as a total capacitance C', together with the circuit inductance L of transformer TR form an oscillating (resonating) circuit.

The problem lies in the energy content of this oscillating circuit. Following each half-wave of the power transmission, an oscillation is excited here by the switching operation of diodes $D_1$, $D_2$, $D_3$, $D_4$ in rectifier GL. In the pulse pause, the oscillation dies down in a damped manner, thus causing heating of transformer TR and possibly of further components connected to transformer TR.

The energy content $E_0$ is easily calculated, since the initial value of the oscillation is specified by the rectangular plateau of the output voltage $U_{out}$. When the diode conducting-state voltage is disregarded (FIG. 6, bottom diagram), the following is obtained:

$$U_0 = U_2(0) = U_{out} \text{ and } E_0 = \tfrac{1}{2} \cdot C' \cdot U_0^2.$$

Thus, the energy $E_0$ at the start of the oscillation is a function only of the effective parasitic capacitance C' and the level of the output voltage $U_{out}$.

In this model representation, the capacitance C' is used for the entire rectifier GL; it combines all physical component and design properties of the rectifier together with the diodes, of the power transformer, and of the lines, which determine the temporal characteristics of the switching operation of the rectifier.

The individual component capacitances for diodes $D_1$, $D_2$, $D_3$, $D_4$, for example, comprise the junction capacitances, housing capacitances, and diffusion capacitances (blocking delay time), and for transformer TR, the capacitance of the winding structure with respect to the housing. Lines are in particular the strip conductors on a circuit board.

In the equivalent circuit diagram, the overall capacitance C' is divided over four identical diode capacitances $C'_{GLR}$ of the individual diodes $D_1$, $D_2$, $D_3$, $D_4$. The value $C'_{GLR} \approx C'$ results from the symmetry of the full bridge system, in the alternating current equivalent circuit diagram of which two capacitors $C'_{GLR}$ are in each case connected in series and another two capacitors are connected in parallel.

For small output currents and for reducing the switching frequency, the pulse pause is relatively long, and the oscillation of the output circuit dies down virtually completely after each switching operation, resulting in a complete loss of the starting energy. Each increase in the parasitic capacitance C' means a loss of efficiency. Thus, the optimization goal of the circuit in this case is an absolute minimization of C'.

For high output currents $I_2(t)$, the pulse pause is small, and the oscillation does not completely die down. In this case, the reduction of the natural frequency by selecting an intentionally higher parasitic capacitance C' may be advantageous: due to the eddy current losses of transformer TR which increase in a strongly nonlinear manner with the frequency (proximity effect), the loss minimum at full load may be present with an increased C'. However, this is advantageous only in the sense of a compromise solution.

According to embodiments of the present invention, the provision of only one additional component in the rectifier portion of the voltage converter is proposed in order to reduce the problems of parasitic oscillation during operation of the voltage converter in discontinuous mode, and at the same time to optimize the function with an expansion of the operational range via a controllable resonance effect.

It is essential that the symmetry of the rectifier circuit GL is eliminated by the additional component. In embodiments of the present invention, the additional component is a capacitor $C_K$.

For this purpose, the second rectifier branch $GL_2$ of the rectifier GL is connected to capacitor $C_K$ which connects the middle node of the second rectifier branch $GL_2$ to the direct current output of the rectifier GL. In the circuit diagram of FIG. 1, the capacitor $C_K$ is situated in parallel between the anode of diode $D_3$ and the anode of diode $D_4$, and thus at the negative line of the output voltage $U_{out}$. It is not illustrated, but equivalent, that the cathodes of diodes $D_3$ and $D_4$, i.e., the positive output line for the second terminal of capacitor $C_K$, may also be selected, provided that the output voltage $U_{out}$ is constant and thus has no influence on the dynamics of the switching operation.

Figure 1:
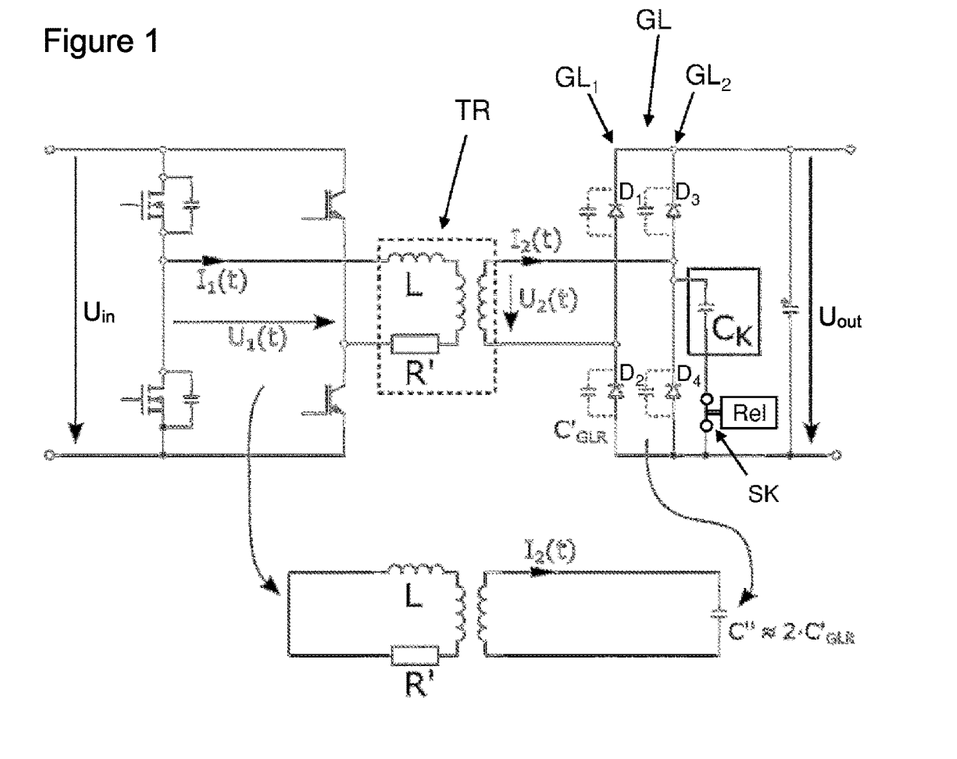
FIG. 1 shows a schematic diagram of a voltage converter designed according to an embodiment of the invention.

The connection of capacitor $C_K$ via switching contact SK of a switching element Rel, illustrated in FIG. 1, is particularly advantageous for the reasons explained in greater detail below, but is optional.

When the capacitance of capacitor $C_K$ is selected to be much larger than the parasitic diode capacitances $C'_{GLR}$, i.e., $$C_K >> C'_{GLR},$$

for high frequencies the input node of rectifier GL thus changed acts as a short circuit. In the alternating current equivalent circuit diagram, the second capacitor, having an identical capacitance level and connected in series, is omitted at the input port of rectifier GL, resulting in a total capacitance C" that is approximately twice that of the original value:

$$C'' \approx 2 \cdot C'_{GLR}.$$

Capacitor $C_K$, due to its asymmetrical configuration in the output circuit of full bridge rectifier system GL, makes use of the nonlinear characteristic curve of the existing uncontrolled diodes $D_1$, $D_2$, $D_3$, $D_4$ for voltage limitation in open-circuit mode and for energy recovery.

Second rectifier branch $GL_2$ together with capacitor $C_K$ forms the slowly switching half of a rectifier circuit that is now asymmetrical, while the significant portion of the dynamics of the voltage profile occurs in the fast first rectifier branch $GL_1$.

Figure 7:
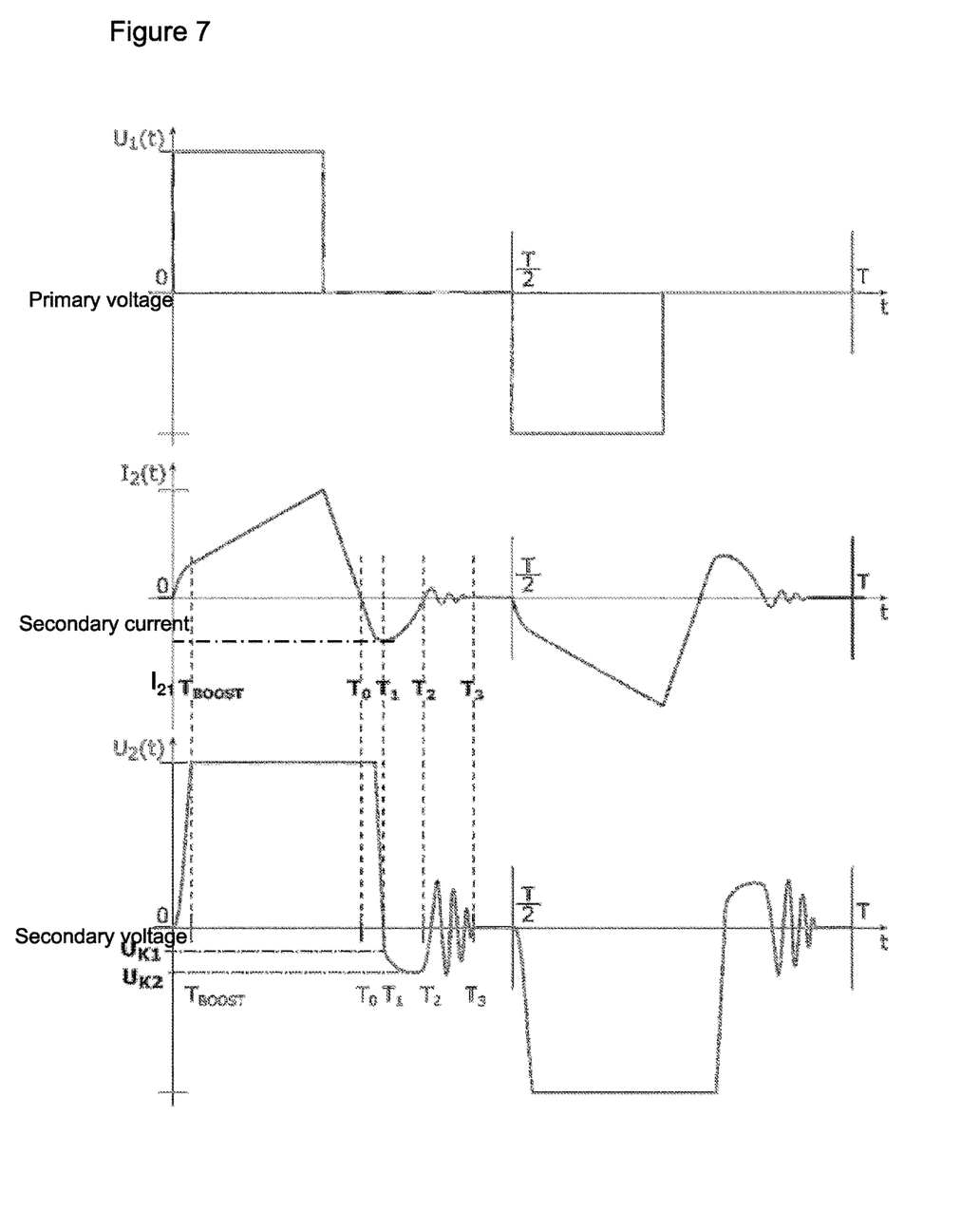
FIG. 7 shows a diagram illustrating the basic pattern of the current and the voltage during operation of the voltage converter designed according to the embodiment of the present invention.

The energy from the recharging process of fast first rectifier branch $GL_1$ having the capacitance $2 \cdot C'_{GLR}$ is reduced or dissipated in three phases $T_0 \to T_1 \to T_2 \to T_3$, where $T_0, T_1, T_2, T_3$ denote the beginning or end times of the successive phases (FIG. 7).

The energy of the parasitic oscillating circuit is not damped or attenuated, but instead is charged into capacitor $C_K$ and stored essentially loss-free during the pulse pause. Although parasitic post-oscillation continues to subsequently occur at the input terminals of second rectifier branch $GL_2$, it has a greatly reduced amplitude and a lower frequency.

Due to the activation of power switches $S_1$, $S_2$, $S_3$, and $S_4$ on the primary side, the voltage at the input of transformer TR is essentially zero volts for the time period that secondary-side diodes $D_1$, $D_2$, $D_3$, $D_4$ are blocked, so that in the equivalent circuit diagram, only inductance L with a primary-side short circuit takes part in the oscillation process.

In the first phase $T_0 < t < T_1$ (see FIG. 7), the transition from the conductive state into the completely blocked state takes place in fast first rectifier branch $GL_1$.

After the triangular useful current has decayed to zero, rectifier diodes $D_1$ or $D_2$ require a component-, design-, and current-dependent charge quantity in the blocking (reverse) direction until the conduction process has completely finished and reverse voltage is built up. As a result, secondary current $I_2(t)$, based on the flow direction of the previously conducting diode, reaches negative values. The negative current flow causes recharging of capacitors $C'_{GLR}$ of first rectifier branch $GL_1$ by the magnitude of the maximum reverse voltage, approximately equal to output voltage $U_{out}$.

The current flow during this first phase simultaneously charges capacitor $C_K$. Since capacitor $C_K$ is selected to be much larger than the parasitic capacitance $C'_{GLR}$, the instantaneous voltage across capacitor $C_K$ reaches values that are very low compared to the maximum reverse voltage. Accordingly, the maximum negative current amplitude is reached when the previously conductive diode in the fast first rectifier branch $GL_1$ completely blocks, and the negative current from transformer TR commutes to the complementary diode. The negative current maximum is denoted by $I_2(T_1) = I_{21}$ here.

The second phase $T_1 < t < T_2$ by definition begins with the current maximum at $I_2(t) = I_{21}$ as soon as the output voltage $U_2(t)$ of transformer TR passes through the value zero and capacitor $C_K$ has reached a low voltage value $U_{K1}$. The energy stored in inductor L then further charges capacitor $C_K$ at an absolutely dropping output current $I_2(t)$ until approximately twice the energy is achieved there at the voltage value $U_{K2} = 2 \cdot U_{K1}$, where $U_{K1}$ and $U_{K2}$ denote the voltages at capacitor $C_K$ at points in time $T_1$ and $T_2$. For this phase, the complementary diode conducts in fast first rectifier branch $GL_1$.

The third phase $T_2 < t < T_3$ begins with the renewed current zero crossing of $I_2(t)$. Fast first rectifier branch $GL_1$ now oscillates freely with the initial amplitude $U_{K2}$, damped via the effective loss resistance R'.

An important feature, resulting from embodiments of the present invention, for the phase beginning with $T_2$ is the asymmetrical division of the voltages in fast rectifier branch $GL_1$ and in slow rectifier branch $GL_2$ on account of $U_{K2} << U_{out}$.

The selection of capacitor $C_K$ with a much greater capacitance value than $C'_{GLR}$, due to capacitive voltage division, reduces the value of the initial condition for the parasitic residual oscillation of fast first rectifier branch $GL_1$ in phases $T_2$ through $T_3$. Due to the fact that the energy drops in proportion to the square of the voltage amplitude according to $E=\frac{1}{2} \cdot C \cdot U^2$, the energy loss during damping of the residual oscillation may be arbitrarily lowered or damped.

A further characteristic of the circuit design in the shown configuration is the initial condition at the start of each of the subsequent following cycles of the power transmission in the time period between $t=0$ and $t=T_{BOOST}$.

The initial condition is a small residual voltage of approximately $U_{K2}$ across capacitor $C_K$, wherein capacitor $C_K$ at the beginning of each half-wave of the power transmission reaches a steady state from this small magnitude to the full magnitude of the output voltage $U_{out}$. The transient response is completed in each case at point in time $t=T_{BOOST}$. The transient response is illustrated by the middle and bottom diagrams in FIG. 7.

In conjunction with the transformed inductance L of the voltage converter, the effect of this periodic reversal operation is a parallel resonance, based on the output of rectifier GL together with the connected load. This results in an increase in the initial value of the triangular current transmission, and an increase in the average output current (boost effect).

It is particularly advantageous that capacitor $C_K$, and thus the boost effect, in this configuration may have a design that can be switched off or selectively switched on. By means of a switching contact SK of a slow, low load switching element "Rel" that may be designed as a relay, bipolar transistor, IGBT, or MOSFET, for example, it is possible to set various operating modes, each with a different transconductance of the voltage converter. Two of the possible designs of the switching contact SK are shown in FIG. 1 (relay) and FIG. 2 (MOSFET).

In the application, the adjustment range of the transfer ratio which is thus increased allows, for example, selectively or in combination, significant installation space savings and/or a reduction of the transformer magnetization and of the core losses, and thus, a drop in temperature.

The decreased oscillation amplitude in the rectifier circuit GL also allows a reduction of the electromagnetic interference emission.

Figures 2, 3:
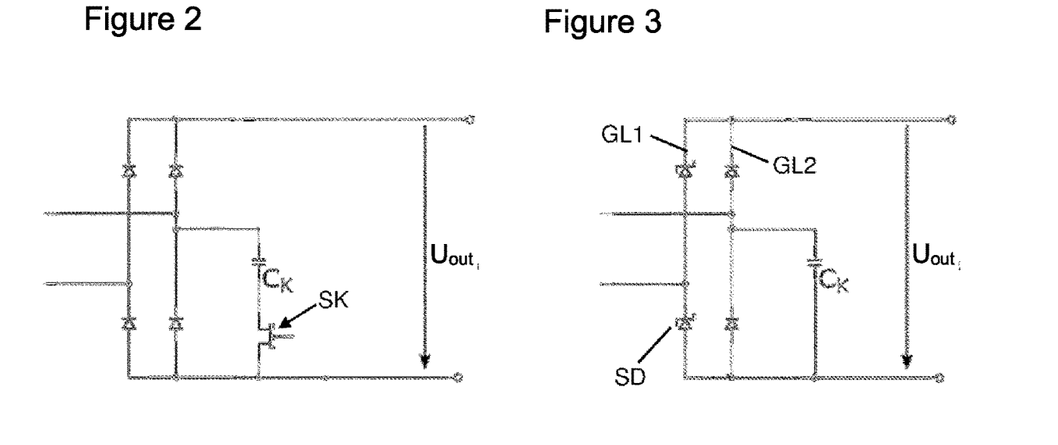
FIG. 2 shows a variant for the voltage converter designed according to the embodiment of the present invention, with output voltage ranges that may be switched over in stages and a MOSFET as switchover element.
FIG. 3 shows another variant for the voltage converter designed according to the embodiment of the present invention, with a mixed assembly of differently optimized components in the rectifier.

FIG. 3 shows another variant of the design, in which use is advantageously made here of the fact that the asymmetrical design of the rectifier GL allows a mixed design with fast rectifier components, for example ultrafast or Schottky diodes SD, only for fast first rectifier branch $GL_1$, while the complementary slow second rectifier branch $GL_2$ with simple diodes is designed as slow-switching components that are optimized for loss.

REFERENCE AND FORMULA SYMBOLS $C_1$, $C_2$ capacitors
$C_3$ smoothing capacitor
$C_K$ capacitor
$C'$ total capacitance (without capacitor $C_K$)
$C''$ total capacitance (with capacitor $C_K$)
$C'_{GLR}$ (parasitic) capacitance(s)
$D_1$, $D_2$, $D_3$, $D_4$ diodes
$E_0$ energy content (of the oscillation)
$G_1$, $G_2$, $G_3$, $G_4$ control connection
GL full bridge rectifier system, rectifier
$GL_1$ (fast) first rectifier branch
$GL_2$ (slow) second rectifier branch
$I_2(t)$ output current transformer, triangular current, secondary current
$I_{21}$ current amplitude (of $I_2(t)$ at point in time $T_1$)
$K_1$, $K_2$ circuit node
L circuit inductor, storage throttle
$L_1$, $L_1'$; $L_2$, $L_2'$; $L_3$, $L_3'$; $L_4$, $L_4'$ power connections
PW primary winding
R' damping resistance, loss resistance
Rel switching element
SD Schottky diode
SK switching contact
SW secondary winding
$S_1$, $S_2$, $S_3$, $S_4$ power switches
T work cycle (time period), duty cycle (duration)
t time (variable)
$T_{BOOST}$ point in time (steady state)
$T_0$, $T_1$, $T_2$, $T_3$ points in time
$t_a$, $t_b$ time periods
TR transformer with circuit inductance L
$U_{in}$ input direct voltage, input DC voltage
$U_{out}$ output direct voltage, output DC voltage
$U_1(t)$ primary voltage (at transformer TR)
$U_2(t)$ secondary voltage (at transformer TR)
$U_0$ voltage in phase $T_0$, initial condition
$U_{K1}$ voltage of capacitor $C_K$ at point in time $T_1$
$U_{K2}$ voltage of capacitor $C_K$ at point in time $T_2$ While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A voltage converter for direct current, comprising:
   a circuit bridge having first, second, third, and fourth power switches, each power switch includes a control connection and a load path extending between two power connections, the load paths of the first and second power switches being connected to a first circuit node and being connected in series between positive and negative terminals for an input direct voltage, and the load paths of the third and fourth power switches being connected to a second circuit node and being connected in series between the positive and negative terminals for the input direct voltage;
   a full bridge rectifier having first and second rectifier branches, the first rectifier branch having first and second diodes and the second rectifier branch having third and fourth diodes, the first and second diodes of the first rectifier branch being connected to a third circuit node and being connected in series between positive and negative terminals for an output direct voltage, and the third and fourth diodes of the second rectifier branch being connected to a fourth circuit node and being connected in series between the positive and negative terminals for the output direct voltage;
   a transformer having a primary winding connected between the first and second circuit nodes of the circuit bridge and a secondary winding connected between the third and fourth circuit nodes of the full bridge rectifier; and
   a capacitor asymmetrically connected to the second rectifier branch in that the capacitor connects the fourth circuit node of the second rectifier branch to one of the positive and negative terminals for the output direct voltage with no other capacitor connecting the fourth circuit node of the second rectifier branch to the other one of the positive and negative terminals for the output direct voltage.

2. The voltage converter of claim 1 further comprising:
an electromechanical or electronic switching element having a switching contact; and
wherein the capacitor is dis-connectable from the second rectifier branch via the switching contact.

3. The voltage converter of claim 1 wherein:
the third and fourth diodes of the second rectifier branch are embodied as slow-switching electronic switches and the first and second diodes of the first rectifier branch are embodied as fast-switching electronic switches.

4. The voltage converter of claim 1 wherein:
the first and second power switches are formed by MOSFETs; and
the third and fourth power switches are formed by IGBTs.

5. The voltage converter of claim 4 wherein:
the third and fourth power switches are switched in an at least virtually current-free state and the first and second power switches are switched in an initially voltage-free state at maximum current flow.

6. The voltage converter of claim 4 wherein:
the circuit bridge further includes first and second capacitors connected in parallel to the load paths of the first and second switches, respectively.

7. The voltage converter of claim 1 wherein:
the third and fourth power switches are switched in an at least virtually current-free state and the first and second power switches are switched in an initially voltage-free state at maximum current flow.

8. The voltage converter of claim 1 wherein:
the voltage converter is operated at least temporarily in discontinuous mode.

9. The voltage converter of claim 1 wherein:
the first and second diodes of the first rectifier branch are Schottky diodes; and
the third and fourth diodes of the second rectifier branch are simple diodes.

10. A voltage converter for direct current, comprising:
a power converter circuit having a transformer, a switch converter bridge on a primary-side of the transformer, and a full-bridge rectifier on a secondary side of the transformer, the full-bridge rectifier having first and second rectifier branches, the first rectifier branch having first and second diodes that are connected to a first circuit node and are connected in series between positive and negative terminals for an output direct voltage, and the second rectifier branch having third and fourth diodes that are connected to a second circuit node and are connected in series between the positive and negative terminals for the output direct voltage; and
a capacitor asymmetrically connected to the second rectifier branch in that the capacitor connects the second circuit node of the second rectifier branch to one of the positive and negative terminals for the output direct voltage with no other capacitor connecting the second circuit node of the second rectifier branch to the other one of the positive and negative terminals for the output direct voltage.

11. The voltage converter of claim 10 further comprising:
an electromechanical or electronic switching element; and
wherein the capacitor is dis-connectable from the second rectifier branch via the switching element.

12. The voltage converter of claim 10 wherein:
the third and fourth diodes of the second rectifier branch are embodied as slow-switching electronic switches and the first and second diodes of the first rectifier branch are embodied as fast-switching electronic switches.

13. The voltage converter of claim 10 wherein:
the voltage converter is operated at least temporarily in discontinuous mode.

14. The voltage converter of claim 10 wherein:
the switch converter bridge includes a first bridge portion having serially connected power switches formed by MOSFETS and a second bridge portion having serially connected power switches formed by IGBTs.

15. The voltage converter of claim 10 wherein:
the first and second diodes of the first rectifier branch are Schottky diodes; and
the third and fourth diodes of the second rectifier branch are simple diodes.

16. The voltage converter of claim 1 further comprising:
a second capacitor, the second capacitor being connected between the positive and negative terminals for the output direct voltage.

17. The voltage converter of claim 10 further comprising:
a second capacitor, the second capacitor being connected between the positive and negative terminals for the output direct voltage.

* * * * *